(12) United States Patent
Levy et al.

(10) Patent No.: US 11,727,008 B1
(45) Date of Patent: Aug. 15, 2023

(54) DATABASE TABLE WITH A MINIMUM-MAXIMUM FILTER FOR MULTIPLE RANGES

(71) Applicant: VAST DATA LTD., Tel Aviv (IL)

(72) Inventors: Asaf Levy, Tel Aviv (IL); Eyal Gordon, Tel Aviv (IL)

(73) Assignee: VAST DATA LTD., Tel Aviv (IL)

( * ) Notice: Subject to any disclaimer, the term of this patent is extended or adjusted under 35 U.S.C. 154(b) by 0 days.

(21) Appl. No.: 17/810,336

(22) Filed: Jun. 30, 2022

(51) Int. Cl.
*G06F 16/2455* (2019.01)

(52) U.S. Cl.
CPC ................. *G06F 16/24557* (2019.01)

(58) Field of Classification Search
CPC .................................. G06F 16/24557
See application file for complete search history.

(56) References Cited

U.S. PATENT DOCUMENTS

| | | | | |
|---|---|---|---|---|
| 8,825,959 | B1 * | 9/2014 | Switakowski | G06F 12/12 711/133 |
| 11,500,842 | B2 * | 11/2022 | Bao | G06F 7/36 |
| 2014/0095502 | A1 * | 4/2014 | Ziauddin | G06F 16/285 707/E17.046 |
| 2014/0095520 | A1 * | 4/2014 | Ziauddin | G06F 16/24557 707/E17.014 |
| 2015/0286682 | A1 * | 10/2015 | Ziauddin | G06F 16/24542 707/718 |
| 2017/0116136 | A1 * | 4/2017 | Macnicol | G06F 12/1408 |
| 2017/0169070 | A1 * | 6/2017 | Finnie | G06F 16/2358 |
| 2018/0329973 | A1 * | 11/2018 | Sherkat | G06F 16/24545 |
| 2018/0329974 | A1 * | 11/2018 | Bensberg | G06F 16/2282 |
| 2020/0192884 | A1 * | 6/2020 | Bao | H03M 7/4031 |

* cited by examiner

*Primary Examiner* — William Spieler
(74) *Attorney, Agent, or Firm* — Reches Patents

(57) ABSTRACT

A method for responding to a tabular database (TD) query, the method may include (i) receiving the TD query, wherein the TD query comprises one or more numerical conditions; (ii) determining, using gap filters and based on the one or more numeral conditions, a relevancy to the TD query of groups of cells of the TD that are associated with the gap filters; wherein different gap filters are associated with different groups of cells of the TD; wherein each gap filter comprises one or more pairs of minimum-maximum values that are defined based on one or more gaps between sorted values of the group of cells, wherein at least one gap filter of the gap filters is set up based on a storage parameter of the gap filter and a filtering parameter of the gap filter; (iii) skip a scanning of one or more groups of cells of the TD that are irrelevant to the TD query; and (iv) generate a response to the TD query, wherein the generating comprises scanning one or more groups of cells of the TD that are relevant to the TD query.

16 Claims, 7 Drawing Sheets

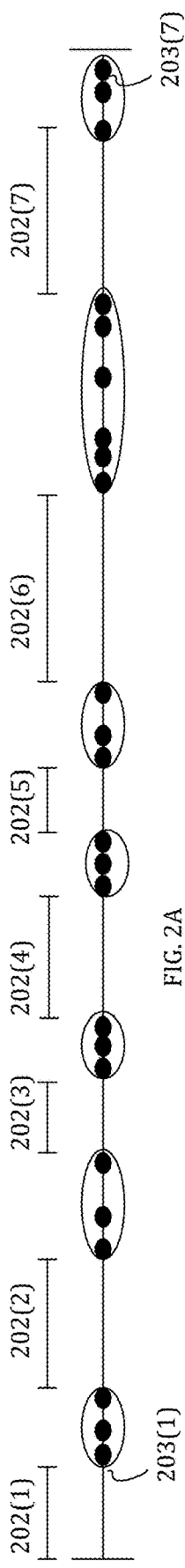
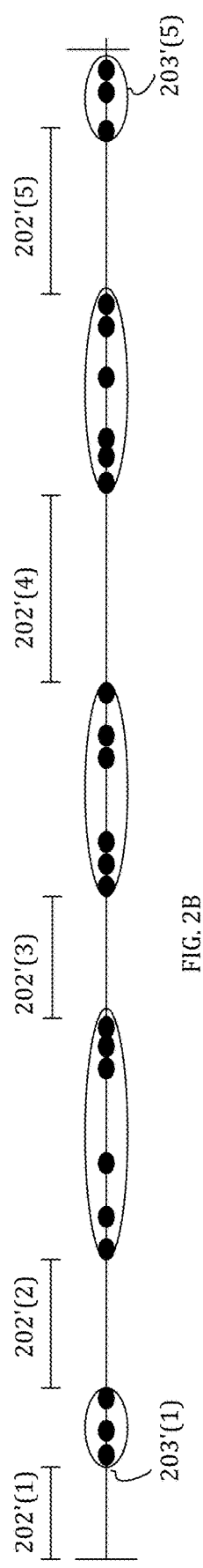
FIG. 2A
FIG. 2B

US 11,727,008 B1

DATABASE TABLE WITH A MINIMUM-MAXIMUM FILTER FOR MULTIPLE RANGES

TECHNICAL FIELD

The present disclosure generally relates to the field of data storage, and more particularly to database table with a minimum-maximum filter for multiple ranges.

BACKGROUND

One of the most powerful features of a database is the ability to filter data according to criteria defined by a request addressed to a table of the database, and to respond only with records selected according to the criteria.

Databases often implement various filters associated with certain columns of a table, so as to enable efficient scanning of the columns associated with filtering criteria.

SUMMARY

There may be provide a storage system, a method and a non-transitory computer readable medium for database table with a minimum-maximum filter for multiple ranges.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

FIGS. 2A and 2B are examples of sets of min-max pairs;

DETAILED DESCRIPTION

Figure 1:
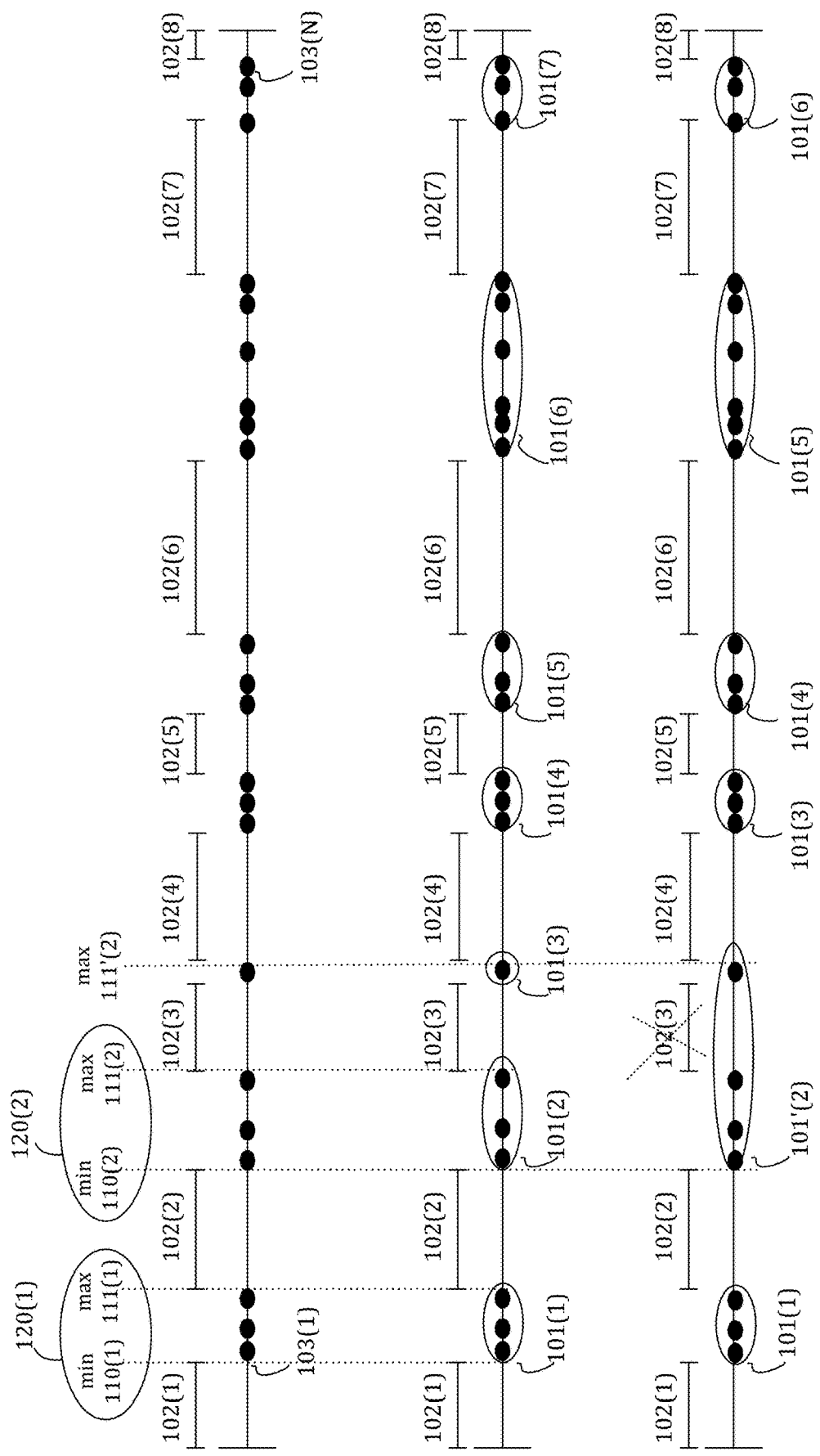
FIG. 1 is an example of grouping values according to gaps.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to a compute core. The compute core can be a processing circuitry, a part of processing circuitry, a virtual machine core, and the like. The processing circuitry may be implemented as a central processing unit (CPU), a graphic processing circuitry (GPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the application may be provided.

There are provided systems, methods, and non-transitory computer readable medium for a database table with a minimum-maximum filter for multiple ranges.

A Minimum-Maximum (min-max) filter is employed for each group of cells in a database table for determining whether the group of cells worth visiting when scanning the database table for finding data that fulfills a requested condition related to one or more groups of cells. The minimum and maximum are two values defining the range of values stored in the group of cells of the table. If the requested values defined by the condition of a query are not within a range defined by a min-max filter of a certain group of cells, then the group of cells can be skipped and the scan continues with the next group of cells, otherwise—the values in the group need to be checked for a match with the requested values.

The group of cells includes multiple cells and may be a portion of a column of the table. A query addressed to the table may include a condition related to a specific column (e.g., 'SQL WHERE' clause), wherein the specific column includes multiple groups of cells, and each group of cells is a portion of the column. Each group of cells is associated with a different min-max filter, that is created based on values stored in the cells of the group.

In some cases, it might be worthwhile to implement more than a single pair of min-max values in a min-max filter of a group of cells, for example, in cases where the values are not evenly spread across the value range between the minimum and maximum, and there are gaps within the value range.

Managing multiple min-max pairs in a min-max filter for each group of cells requires extra space to store them, and therefore the min-max pairs should be selected carefully while considering the benefits of screening out non-covered value ranges versus the storage consumption by the multi min-max-pair filters.

According to embodiments of the invention, multiple min-max pairs may be selected per filter of a group of cells according to the values stored in the group, where each pair may be stored using a more compact presentation with a lower accuracy of the values, i.e., the min-max values may be represented by a smaller number of bits comparing to the full number of bits that would be requested for storing the entire value. The compact presentation is achieved by omitting the least significant part of the min-max values and rounding the values stored in the min-max values when the filter is being used for filtering. For example, the compact presentation may include only the most significant bytes or bits of the value. As for another example, if the values are of date format, the days portion may be omitted, the min-max-value may be expressed as months and years. When using the rounded min-max values for filtering, it is assumed that the min-value refers to the first day of the month indicated in the min-value, and the max-value refers to the last day of the month indicated in the max-value.

An upper limit of the amount of used storage space may be defined per filter. For example, suppose up to 8 bytes are allowed per min-max filter, then the filter may include one min-max pair (e.g., 4 bytes for the minimum value and 4 bytes for the maximum value), or the filter may include two min-max pairs, each pair may occupy 4 bytes (e.g., 2 bytes for the minimum value and 2 bytes for the maximum value) if the min-max values are rounded.

According to embodiments of the invention, an optimal set of min-max pairs in a single filter are determined according to the values within each group of values, as well as the preferred value presentation. An optimal set is a set that: (i) assigns min-max values for the most prominent sub-ranges within the range of values of the set, (ii) that would occupy not more than a predefined amount of storage, and (iii) screens out as much non-used ranges of values as the storage limitation allows. The optimal set of min-max pairs in a single filter can be also viewed as a set that provides maximal size of screened out ranges per storage unit (e.g., byte) consumed by the filter. For example, if the total size of screened out ranges is X when using a set of min-max values that occupies S bytes, then—the score of this pair configuration is: X divided by S. The pair configuration with the highest score is selected.

One or more candidate sets of min-max pairs is examined, where each set of pairs is determined by selecting the top-ranking gaps to facilitate definition of a candidate set of min-max pairs. Multiple candidate sets of min-max pairs can be evaluated for the contribution of screening out ranges, when using different number of pairs (that correspond to a different number of top-ranking gaps). Using a compact presentation of the pairs is also evaluated for the extent of degradation of the screening out versus the screening out by pairs of full (non-compact) presentation.

In order to create min-max pairs of a group of values, the values of the group are clustered into sub-groups of values, by: (i) sorting the values and calculating the size of the gaps between unique values (differences between two consecutive unique values), and (ii) selecting the top K ranking gaps, based on size characteristics of the gaps and further based on quantity characteristics of the values that are separated by the gaps.

Top ranking gaps may be for example, the largest gaps. The top-ranking gaps may further be gaps that are substantially larger than an average gap between two unique values, e.g., larger by at least a factor (twice, 10 times, etc.) than the average gap. A gap may be omitted from the top-ranking gaps, if it separates only a single value or a small number of values from another sub-group of values.

FIG. 1 illustrates sorted unique values 103(1)-103(N) of a group of values, where eight gaps 102(1)-102(8) are selected as the top K=8 ranking gaps, for being the largest gaps. As for another example, it may be determined to omit one or more of the top K ranking gaps, if a gap, e.g., 102(5) is not larger than the average gap by at least a factor.

The top-ranking gaps separate between sub-groups of values within the group of values and facilitate the definition of the corresponding min-max value pairs included in the min-max filter of the group.

The edges of gaps 102 define the min-max values. For example, the right edge of gap 102(1) defines the first min value 110(1), the left edge of gap 102(1) defines the first max value 111(1). The values of min value 110(1) and max value 111(1) define the range associated with the min max pair 120(1). In a similar manner, min 110(2) is defined by the right edge of gap 102(2), and max 111(2) is defined by the left edge of gap 102(3). Min 110(2) and max 111(2) defines the range associated with min-max pair 120(2).

Each of sub-groups of values 101(1)-101(7) is associated with a min-max pair, with a total of seven min-max pairs for the seven sub-groups.

A minimal number of unique values within a sub-group may be determined. In case where a number of values in a sub-group is below a certain number-of-values threshold (an absolute number of values or a percentage of the total number of values) then it may be determined to incorporate the values of the small sub-group under a closest neighbor sub-group, and the modified sub-group will share a wider range defined by its min-max pair. For example, the sub-group 101(3) covers only one value, and it may be determined to incorporate this value under the closest neighbor sub-group 101(2) to produce a sub-group 101'(2) that is associated with a min-max pair that cover a value range between min 110(2) and max 111'(2).

The efficiency of multiple options of: (i) different sub-groups with different number of min-max pairs and (ii) the storage (bits/bytes) presentation of the values of the pairs, is evaluated, based at least on the amount of excluded value ranges.

An iterative algorithm can be used to find the set of min-max values that filters out as much values as possible while attempting to reduce the number of bytes per min-max pair in order to use more pairs.

The iterative algorithm may evaluate different sets of min-max pairs with different numbers of min-max pairs in the sets, e.g., any number of pairs between 1 and the number of a pre-defined number of maximum pairs—can be evaluated. If, for example, the maximum number of pairs defined to be evaluated is 6 pairs, the algorithm may check some of the numbers or any number of pairs between 1-6. At each iteration of the algorithm, top ranking gaps that produce the requested number of pairs is selected.

FIGS. 2A and 2B illustrates two options of generating two sets of min-max pairs to be evaluated. FIG. 2A illustrates seven identified top-ranking gaps 202(1)-202(7) that defines the min-max values of seven sub groups 203(1)-203(7). FIG. 2B illustrates five identified top-ranking gaps 202'(1)-202'(5) that defines the min-max values of five sub groups 203'(1)-203'(5), where less ranked gaps 202(3) and 202(5) are omitted.

For each set configuration, a filtering grade is determined. The filtering grade may be the size of the ranges of values filtered out by the gaps. The size of the ranges is the sum of the ranges covered by the gaps.

Each set will be further tested for at least one compact presentation of the min-max values. When a more compact presentation is selected, there is a need to round the min-max values (align the values to the nearest boundary), so that the gaps are shrunk. For example, suppose the full sized min-max values occupies 8 bytes, and the evaluated compact presentation includes 6 bytes and omits 2 bytes, then the minimum is rounded to a lower boundary of 65536 (2^16 bits), and the maximum is rounded to a higher boundary of 65536.

It is expected that a higher number of min-max values will gain a higher filtering grade because this configuration filters out wider ranges. However, suppose two sets are examined, a first set with a first number of pairs that is higher than a second number of pairs of a second set, but a first filtering grade of the first set is higher only be an insignificant extent, then—the smaller number of pairs will be preferred, and the second set is selected. Similar considerations may be applied when considering a compact presentation of a set versus a non-compact presentation. The compact presentation will be selected when its filtering grade is only slightly lower than the full presentation. The test for selecting the preferred set may be the relation between the size of the filtered range and the storage required for storing the set.

Figure 3A:
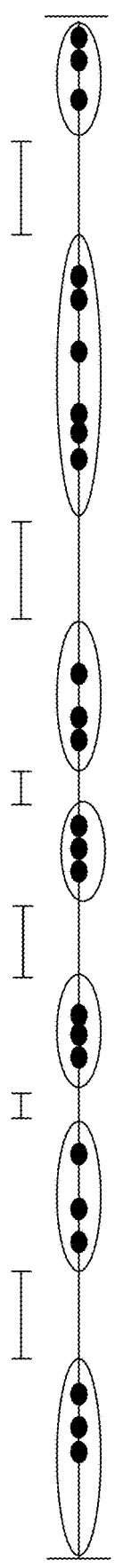
FIGS. 3A, 3B and 3C are examples of candidate sets of sub-groups.
Figure 3B:
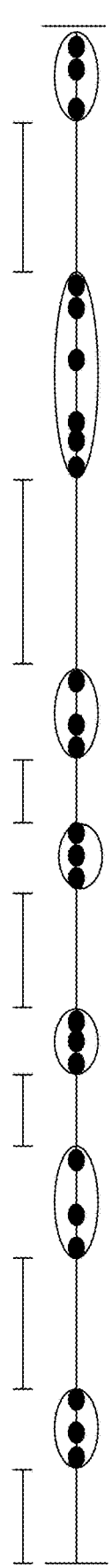
Figure 3C:
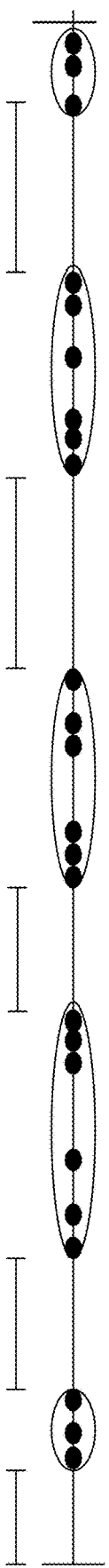

FIGS. 3A-3C illustrates three candidate sets of sub-groups. FIG. 3A illustrates seven sub-groups (associated with seven min-max pairs), where the min-max pairs are stored using a compact presentation. In this case the min-max values are aligned to the nearest borders, which is demonstrated by the elliptic circles that extend beyond the values they circle, which causes shrinking of the gaps, comparing to FIG. 3B that illustrates seven sub-groups having min-max pairs stored in their full presentation (the elliptic circles are not extended beyond the values). FIG. 3C illustrates five sub-groups having min-max pairs stored in their full presentation.

FIGS. 3A-3C further illustrate the sums 301, 302, 303 of the filtered-out ranges of each configuration. Sum 302 of the seven sub-groups is substantially larger than sum 301 of the compact seven groups, and therefore, in this case it may be preferred not to use the compact version of seven pairs. The sum 303 of the five sub-groups is only slightly smaller than the sum 302, therefore, it may be determined to use five pairs in the filter rather than seven.

The selected option may also be the one that provides the highest ratio of filtered-out ranges size per byte of the corresponding set of pairs.

Figure 4:
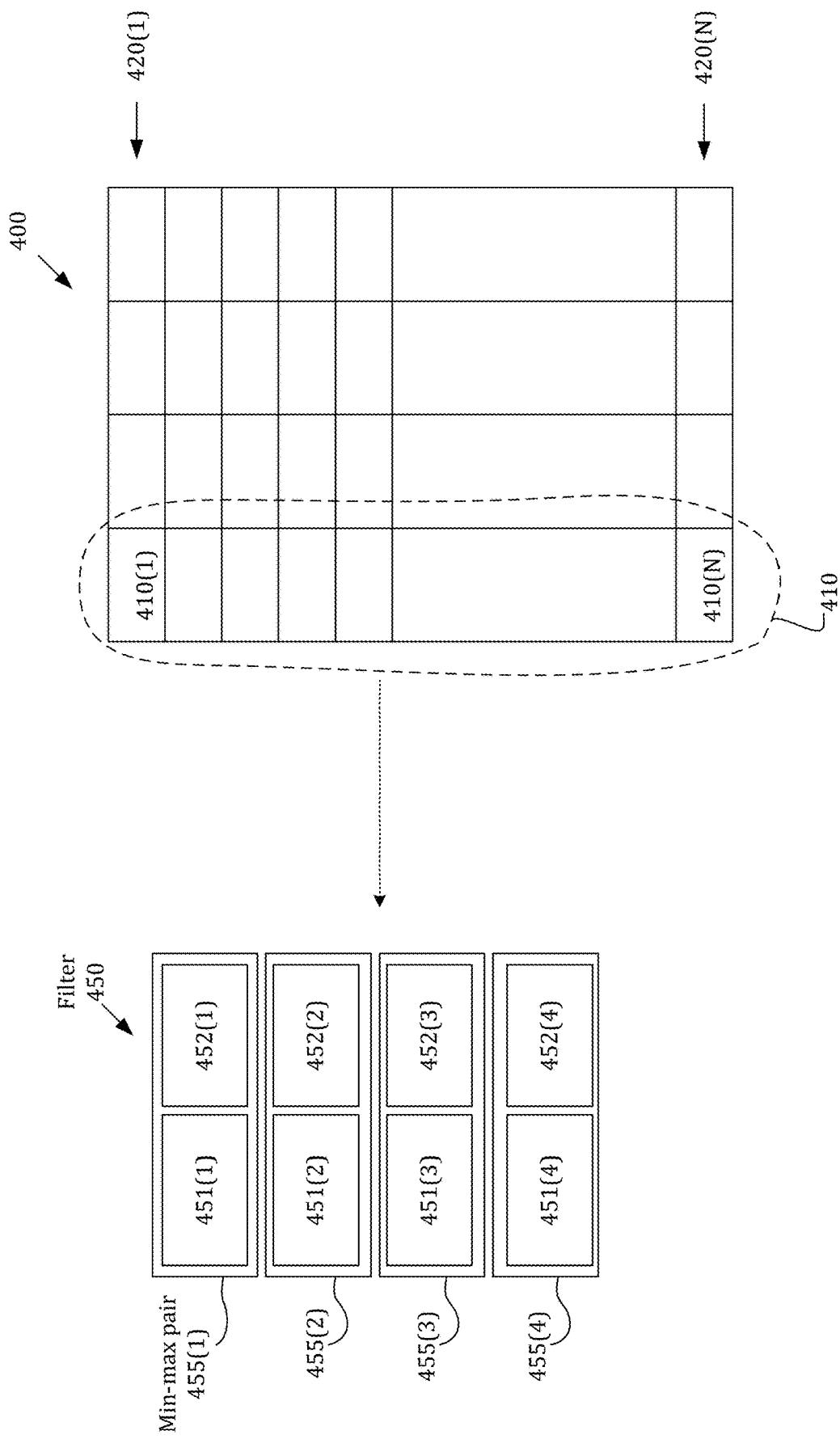
FIG. 4 is an example of a batch of data received by a storage system and the corresponding filter.

FIG. 4 illustrates a batch of data 400 that is received by a storage system as part of a request to add the batch to a database table. The batch of data includes N rows 420(1)-420(N) that are to be appended to the database table as a sequence of rows. The illustrated batch includes four columns. The batch may be stored in a temporary storage space of the storage system, and the creation of the min-max filter for one or more columns of the batch may be performed before the batch is stored in the table.

A group of values 410 is illustrated as the values stored in the cells of one column and includes values 410(1)-410(N).

A min-max filter 450 is created for the group of values 410 and includes, in this example, a set of four min-max values 455(1)-455(4), each includes a min value 451 and a max value 452. There are four min-values 451(1)-451(4) and four max-values 452(1)-452(4).

When a query is received by the storage system from an external entity that accesses the database, wherein the query includes a condition that requires selecting specific values within a column—a filter of each group of cells that is part of the requested column is checked for whether the requested values are part of one of the multiple min-max pairs of the filter. If none of the min-max pairs covers the required values, then the group of cells is skipped without a need to scan the values.

Figure 5:
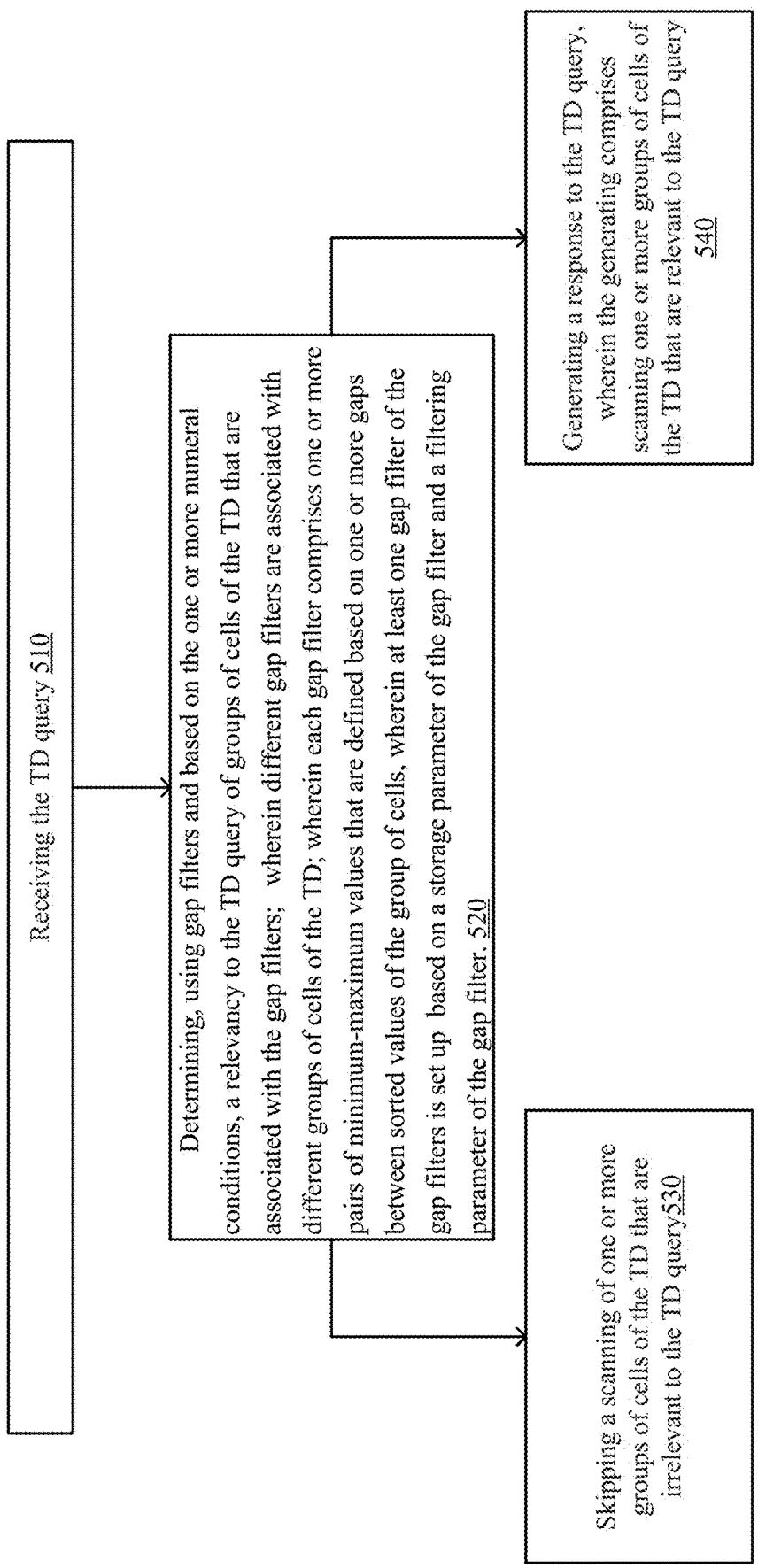
FIG. 5 is an example of a method.

FIG. 5 illustrates a method 500 for responding to a tabular database (TD) query.

Method 500 may start by step 510 of receiving the TD query, wherein the TD query may include one or more numerical conditions. The numerical conditions may include one or more numerical values and an one or more operations related to the one or more numerical condition—for example the query may search for cells that store a value that exceeds a query-defined value, may be within a query-defined range of numbers, may be outside a query-defined range of numbers, may equal a query-defined number, may differ from a query-defined number, may fall behind a query-defined value, and the like. A numerical condition may be addressed to a column of a table of the TD. A numerical condition may include dates condition or other condition that include numbers or number equivalents.

Step 510 may be followed by step 520 of determining, using gap filters and based on the one or more numeral conditions, a relevancy to the TD query of groups of cells of the TD that are associated with the gap filters.

The relevancy of a group of cells determines whether the group of cells is to be skipped according to the gap filter associated with the group. Different gap filters are associated with different groups of cells of the TD. A gap filter may include one or more pairs of minimum-maximum values that are defined based on one or more gaps between sorted values of the group of cells. At least one gap filter of the gap filters is set up (defined or built) based on a storage parameter of the gap filter and a filtering parameter of the gap filter. A group of cells may include a column, a part of a column, or any other group of cells. Examples of gap filters and the setting gap filters that include multiple pairs of minimum-maximum values—are illustrated in FIGS. 2A-2B, 3A-3C and 4.

Step 520 may be followed by step 530 of skipping a scanning of one or more groups of cells of the TD that are irrelevant to the TD query. For example, skipping a group of cells is performed when the step 520 indicates that none of the values stored in the group of cells fulfill the one or more numerical conditions.

Step 530 may be followed by step 540 of generating a response to the TD query, wherein the generating includes scanning one or more groups of cells of the TD that are relevant to the TD query according to step 520. Relevant groups of cells are associated with gap filters that indicate that there are values with the groups of cells that fulfill the conditions, for example—values that fall within one of the minimum-maximum values of a filter.

The storage parameter may be the amount of storage occupied by the gap filter, for example, a size of the gap filter.

The storage parameter selected for the gap filter may also be dependent on the state of the storage system—or at least a state of storage resources allocated to store the gap filter. For example—the available storage resources of the storage system may change over time—and when there are more available storage resources—the storage system may allocate more storage resources to the gap filters. When there are less storage resources or a large number of groups of cells with a large number of filters, the selected storage parameter will include a smaller size, i.e., provides a compact presentation of the minimum-maximum values.

The filtering parameter may refer to the filtering related to one or more gaps. Numerical values that fall within a gap of a gap filter (and does not fall within any of the min-max value range of the gap filter) indicate that the group of cells related to the gap filter are not relevant to the query.

A filtering parameter may be an aggregate size of gaps (indicating filtered-out ranges) defined by the gap filter.

A filtering parameter may be a relationship (for example ratio) between an aggregate size of gaps defined by the gap filter and an aggregate size of sorted values ranges (such as the sub-groups of values 203, 203' of FIGS. 2A-2B).

At least one gap filter may be set to provide a predefined tradeoff between the gap filter's storage parameter and the gap filter's filtering parameter. The predefined tradeoff may be determined in any manner and/or by any entity—client, storage system administrator, and the like. A higher filtering parameter may be preferred, while a lower storage parameter is preferred.

At least one gap filter may be set to provide a desired ratio between an aggregate size of gaps defined by the gap filter and a size of the gap filter. The desired ratio may be a maximal ratio, an optimal ratio or may be defined to be any other ratio. The desired ratio may be determined in any manner and/or by any entity—client, storage system administrator, and the like. The desired ratio may be a maximal ratio among ratios of multiple candidates of gap filters having different number of gaps, of minimum-maximum values, and different compactness of presentation.

The at least one gap filter may be set to provide a maximal ratio between an aggregate size of above-average gaps that are defined by the gap filter and a size of the gap filter.

The at least one gap filter may include at least one minimum value that has a length that is shorter than a length of a value stored in a cell. The 'length' refers to a storage presentation of the values, e.g., in bytes, bits, etc. The same applies mutatis mutandis to at least one maximum value. This may reduce the resolution of the gap filter—but may save storage space. The at least one minimum value may have less bits (for example have one or more least significant bit removed), may emit information (for example be defined according to a month, while the cells of the TD database store dates with day resolution).

The at least one gap filter may include at least one minimum value that has a length that is shorter than a length of a value related to one of the numerical conditions (of the query).

The at least one gap filter may include at least one minimum value that has a length that is shorter than a length of a value stored in a cell. The cell is a cell that belongs to the group of cells associated with the gap filter. If the group includes values of different lengths—the length of the minimum value may be the length of the shortest value of the group of cells.

The filtering parameter may be related to sizes of gaps defined by the gap filter. Each gap separates between sorted values ranges, wherein each sorted values range includes at least a predefined number of sorted values. For example—see FIG. 1—the incorporation of the single value of sub-group 101(3) into neighbor sub-group 101(2).

The at least one gap filter may be determined by defining gap filter candidates and selecting the at least one gap filter out of the gap filter candidates. The generating of the gap filter candidates may be executed in an iterative or non-iterative manner. The selecting may be based on at least one of the storage parameter and the filtering parameter or a relation between the two parameters.

The filtering parameter may be related to a number of gaps defined by the gap filter. For example—the number of gaps may determine the resolution of each pair—and it may be beneficial to maintain a number of pairs that are of adequate resolution.

Figure 6:
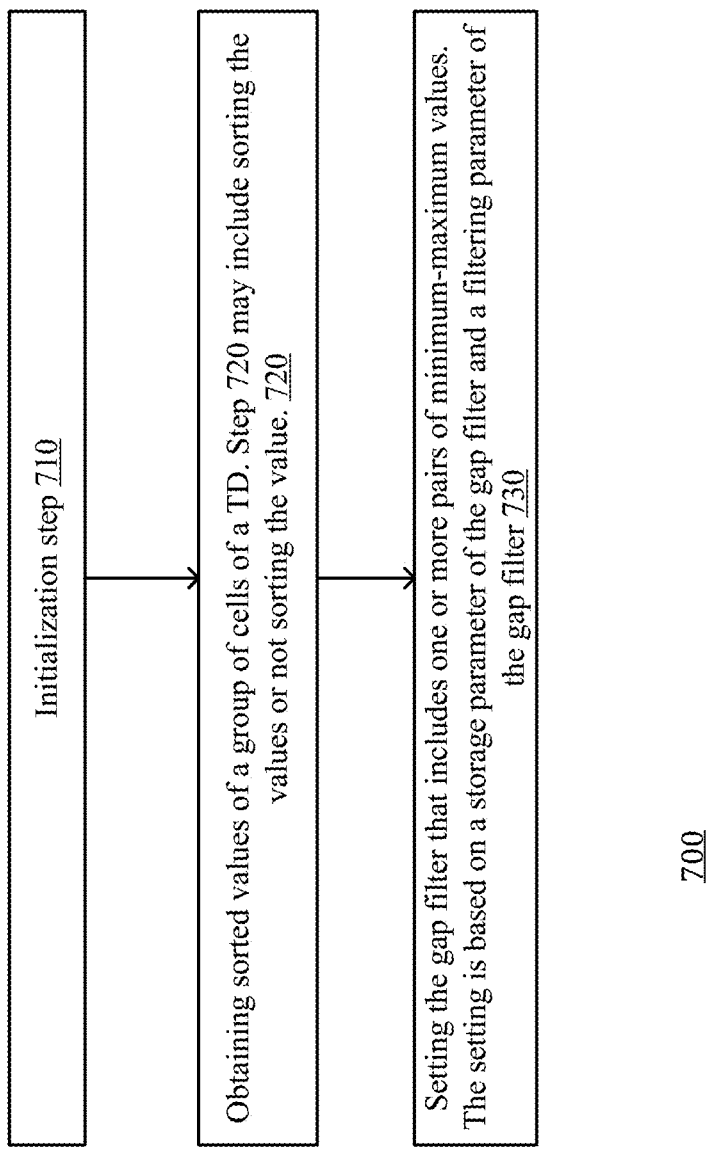
FIG. 6 is an example of a method.

FIG. 6 is an example of method 700 for setting a gap filter.

Method 700 may start by initialization step 710. Initialization step 710 may include receiving one or more gap filter setting rules that may define how to set the gap filter—especially the one or more parameters (for example—storage parameter and/or filtering parameter) that the gap filter should comply with and/or the relationships between the parameters—for example a desired tradeoff between parameters.

Step 710 may be followed by step 720 of obtaining sorted values of a group of cells of a TD. Step 720 may include sorting the values or not sorting the value.

The sorted values may be arranged in sorted values ranges (or sub-groups) that are spaced apart by gaps. Each gap or each sorted value range may be defined by a pair of minimum and maximum values.

Step 720 may be followed by step 730 of setting the gap filter that includes one or more pairs of minimum-maximum values. The setting includes determining the size of the gap filter, sizes of one or more pairs, a number of one or more pairs, and the like.

Step 720 may include setting based on a storage parameter of the gap filter and a filtering parameter of the gap filter. The setting may be based on more than one storage parameter and more than one filtering parameters.

Step 720 may be executed in an iterative manner—in which different gap filter candidates are evaluated. For example—the iteration may include checking different numbers of gaps, checking different allocations of gaps, different minimal numbers of group values per sorted values ranges, various constraints on a size of gaps (for example minimal value), length of minimum and/or maximum values of pairs, and the like.

Figure 7:
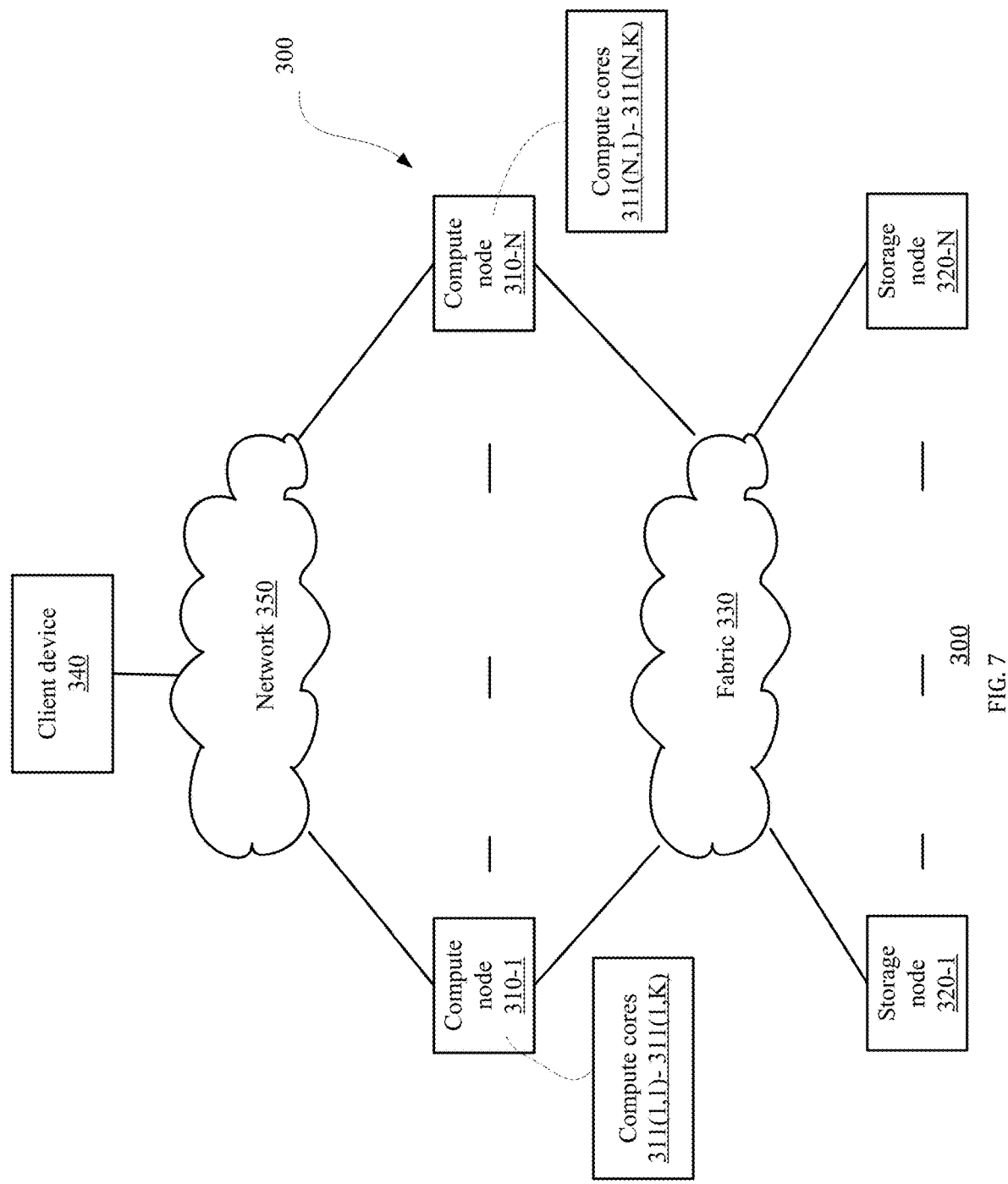
FIG. 7 is an example of a storage system.

FIG. 7 shows an example diagram of a storage system 300 according to the disclosed embodiments.

The storage system 300 includes a number of N compute nodes 310-1 through 310-N (hereinafter referred to individually as a compute node 310 and collectively as compute nodes 310, merely for simplicity purposes, N is an integer equal to or greater than 1). The compute nodes include (or may execute) multiple compute cores each (for example 311(1,1)-311(1,K) of compute node 310-1 and 311(N,1)-311(N,K) of compute node 310-N).

The storage system 300 also includes a number of M storage nodes 320-1 through 320-M (hereinafter referred to individually as a storage node 320 and collectively as storage nodes 320, merely for simplicity purposes, M is an integer equal to or greater than 1). The compute nodes 310 and the storage nodes 320 are connected through a communication fabric 330. M may equal N or may differ from N.

In an embodiment, a compute node 310 may be realized as a physical machine or a virtual machine. A physical machine may include a computer, a sever, and the like. A virtual machine may include any virtualized computing instance (executed over a computing hardware), such as a virtual machine, a software container, and the like.

It should be noted that in both configurations (physical or virtual), the compute node 310 does not require any dedicated hardware.

A compute node 310 is configured to perform tasks related the execution of method 500 and/or method 700. In an embodiment, each compute node 310 may interface one or more client devices (such as client device 340). The compute nodes may receive from the client devices (requesting entities) requests such as TD queries that include numerical conditions. The generated responses to the TD queries are sent by the compute nodes to the client devices. The compute nodes interface the clients via one or more networks, such as network 350. The network may be, but is not limited to, the Internet, the world-wide-web (WWW), a local area network (LAN), a wide area network (WAN), and the like. The response to the query may be sent via the interface.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" should be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

What is claimed is:

1. A method for responding to a tabular database (TD) query, the method comprises:
receiving the TD query, wherein the TD query comprises one or more numerical conditions;
determining, using gap filters and based on the one or more numeral conditions, a relevancy to the TD query of groups of cells of the TD that are associated with the gap filters; wherein different gap filters are associated with different groups of cells of the TD; wherein each gap filter comprises one or more pairs of minimum-maximum values that are defined based on one or more gaps between sorted values of the group of cells, wherein at least one gap filter of the gap filters is set up based on a storage parameter of the gap filter and a filtering parameter of the gap filter;

skipping a scanning of one or more groups of cells of the TD that are irrelevant to the TD query; and generating a response to the TD query, wherein the generating comprises scanning one or more groups of cells of the TD that are relevant to the TD query.

2. The method according to claim 1 wherein the storage parameter is a size of the gap filter.

3. The method according to claim 1, wherein the filtering parameter is an aggregate size of gaps defined by the gap filter.

4. The method according to claim 1, wherein the filtering parameter is a relationship between an aggregate size of gaps defined by the gap filter and an aggregate size of sorted values ranges.

5. The method according to claim 1, wherein the at least one gap filter is set to provide a predefined tradeoff between the gap filter storage parameter and the gap filter filtering parameter.

6. The method according to claim 1, wherein the at least one gap filter is set to provide a desired ratio between an aggregate size of gaps defined by the gap filter and a size of the gap filter.

7. The method according to claim 1, wherein the at least one gap filter is set to provide a maximal ratio between an aggregate size of above-average gaps that are defined by the gap filter and a size of the gap filter.

8. The method according to claim 1, wherein the at least one gap filter comprises at least one minimum value that has a length that is shorter than a length of a value stored in a cell.

9. The method according to claim 1, wherein the at least one gap filter comprises at least one minimum value that has a length that is shorter than a length of a value related to one of the numerical conditions.

10. The method according to claim 1, wherein the at least one gap filter comprises at least one extremum value that has a length that is shorter than a length of a value stored in a cell.

11. The method according to claim 1, wherein the filtering parameter is related to sizes of gaps defined by the gap filter, wherein each gap separates between sorted values ranges, wherein each sorted values range comprises at least a predefined number of sorted values.

12. The method according to claim 11 wherein the at least one gap filter is determined by defining gap filter candidates and selecting the at least one gap filter out of the gap filter candidates.

13. The method according to claim 12 wherein the selecting is based on at least one of the storage parameter and the filtering parameter.

14. The method according to claim 1, wherein the filtering parameter is related to a number of gaps defined by the gap filter.

15. A non-transitory computer readable medium for responding to a tabular database (TD) query, the non-transitory computer readable medium stores instructions that once execute by a processor causes the processor to:

receive the TD query, wherein the TD query comprises one or more numerical conditions;

determine, using gap filters and based on the one or more numeral conditions, a relevancy to the TD query of groups of cells of the TD that are associated with the gap filters;

wherein different gap filters are associated with different groups of cells of the TD; wherein each gap filter comprises one or more pairs of minimum-maximum values that are defined based on one or more gaps between sorted values of the group of cells, wherein at least one gap filter of the gap filters is set up based on a storage parameter of the gap filter and a filtering parameter of the gap filter;

skip a scanning of one or more groups of cells of the TD that are irrelevant to the TD query; and generate a response to the TD query, wherein the generating comprises scanning one or more groups of cells of the TD that are relevant to the TD query.

16. A storage system configured to respond to a tabular database (TD) query, the storage system comprises one or more computer entities that are configured to:

receive the TD query, wherein the TD query comprises one or more numerical conditions;

determine, using gap filters and based on the one or more numeral conditions, a relevancy to the TD query of groups of cells of the TD that are associated with the gap filters; wherein different gap filters are associated with different groups of cells of the TD; wherein each gap filter comprises one or more pairs of minimum-maximum values that are defined based on one or more gaps between sorted values of the group of cells, wherein at least one gap filter of the gap filters is set up based on a storage parameter of the gap filter and a filtering parameter of the gap filter;

skip a scanning of one or more groups of cells of the TD that are irrelevant to the TD query; and generate a response to the TD query, wherein the generating comprises scanning one or more groups of cells of the TD that are relevant to the TD query.

* * * * *